(12) United States Patent
Kramer et al.

(10) Patent No.: US 9,836,103 B2
(45) Date of Patent: Dec. 5, 2017

(54) WIRELESS PERSONAL TRACKING DEVICE

(71) Applicants: Mark Kramer, Castle Rock, CO (US);
Wilfred Tucker, Centennial, CO (US);
John Sample, Centennial, CO (US);
Christopher Bermel, Denver, CO (US)

(72) Inventors: Mark Kramer, Castle Rock, CO (US);
Wilfred Tucker, Centennial, CO (US);
John Sample, Centennial, CO (US);
Christopher Bermel, Denver, CO (US)

( * ) Notice: Subject to any disclaimer, the term of this patent is extended or adjusted under 35 U.S.C. 154(b) by 0 days.

(21) Appl. No.: 13/661,176

(22) Filed: Oct. 26, 2012

(65) Prior Publication Data

US 2014/0118108 A1    May 1, 2014

(51) Int. Cl.
*G06F 1/26*    (2006.01)
(52) U.S. Cl.
CPC ...................... *G06F 1/26* (2013.01)
(58) Field of Classification Search
CPC ................................. G07C 9/00879
USPC ..... 340/5.52, 5.6, 5.8, 10.5, 539.13, 539.21; 342/450
See application file for complete search history.

(56) References Cited

U.S. PATENT DOCUMENTS

| | | | |
|---|---|---|---|
| 5,280,527 A | 1/1994 | Gullman et al. | |
| 5,450,491 A | 9/1995 | McNair | |
| 5,623,552 A | 4/1997 | Lane | |
| 6,405,213 B1 * | 6/2002 | Layson et al. | 707/758 |
| 6,414,629 B1 * | 7/2002 | Curcio | 342/357.52 |
| 7,015,817 B2 * | 3/2006 | Copley et al. | 340/573.4 |
| 7,278,026 B2 | 10/2007 | McGowan | |
| 7,424,134 B2 | 9/2008 | Chou | |
| 7,602,303 B2 * | 10/2009 | Douglas et al. | 340/573.4 |
| 7,739,744 B2 | 6/2010 | Burch et al. | |
| 7,788,500 B2 | 8/2010 | Okamura et al. | |
| 7,936,905 B2 | 5/2011 | Takahashi et al. | |
| 7,953,670 B2 | 5/2011 | Colella | |
| 8,036,431 B1 * | 10/2011 | Fisher | G06K 9/00013 382/115 |
| 8,165,633 B2 * | 4/2012 | Chang et al. | 455/557 |
| 8,234,507 B2 * | 7/2012 | Zhu et al. | 713/300 |
| 8,289,135 B2 | 10/2012 | Griffin | |
| 8,473,241 B2 * | 6/2013 | Foxlin | 702/150 |
| 2005/0204149 A1 * | 9/2005 | Watanabe | A61B 5/1172 713/186 |
| 2006/0107067 A1 | 5/2006 | Safal et al. | |
| 2007/0069010 A1 | 3/2007 | Mestres et al. | |

(Continued)

*Primary Examiner* — Vernal Brown
(74) *Attorney, Agent, or Firm* — Gearhart Law LLC

(57) ABSTRACT

An apparatus for tracking, security, badging, and reporting is disclosed, as is a method of use. The apparatus may take the form of a keycard, fob, badge, or other encapsulated electronic device. The incorporation of an electronic compass, accelerometer, and wireless transceiver allows for the more dynamic uses of the apparatus when compared to existing radio frequency identification (RFID) cards. The power is supplied by a thin film micro energy cell (MEC) battery. Additionally, the apparatus has energy harvesting capabilities to recharge the battery. The apparatus interacts with various communication points, including but not limited to, computer terminals, mobile devices, security points, and entryways. This is achieved using a protocol such as Bluetooth Low Energy. The apparatus interacts and communicates with a host system employed on the premises.

12 Claims, 2 Drawing Sheets

(56) References Cited

U.S. PATENT DOCUMENTS

| | | | |
|---|---|---|---|
| 2008/0024427 A1* | 1/2008 | Kuo et al. | 345/107 |
| 2008/0238670 A1* | 10/2008 | Carney | B42D 25/318 340/546 |
| 2010/0201498 A1 | 8/2010 | Griffin | |
| 2012/0218079 A1 | 8/2012 | Kim | |

* cited by examiner

WIRELESS PERSONAL TRACKING DEVICE

CROSS REFERENCE TO RELATED APPLICATIONS

This application is a non-provisional of U.S. Provisional Application Ser. No. 61/552,080 filed on Oct. 27, 2011 which is herein incorporated by reference in its entirety.

FIELD

The field of the invention relates to a wireless personal security, tracking, activity, identification, badging, and reporting apparatus and a method of use.

BACKGROUND

Radio frequency identification (RFID) cards or tags use radio waves to transfer data between a RFID device and an associated reader. This enables the tracking and identification of the person or item carrying the tag. The uses for RFIDs are widespread and numerous. They are used in the workplace, the shipping of materials, electronic toll systems, and various other applications. These tags are directly or indirectly a part of daily life, although their use is often not seen by the consumer.

Currently, there are many issues with these types of tags. Each country sets their own standard for the operable frequency of the card or tag. In turn, a tag with a particular radio frequency used in the United States is not compatible with a system operating on a different frequency in Japan. Additionally, there are issues with security involved in the use of RFIDs. For instance, there is no safeguard to ensure that a user of a card or tag is the person authorized to use said card or tag. The cards also only provide data as to the type of good(s) it contains and gives locational information as to when and where the card is scanned by an associated reader, hence only limited data information may be transmitted. This limitation on data transfer is also further exacerbated by the employment of near field communication (NFC) in such devices. NFC requires a RFID tag or card to be within a specified distance, often mere centimeters, to the corresponding reader in order to be read. This prevents the use of such tags or cards in real time tracking and identification applications.

In the business world, items such as hourly billing, employee activity, and security are handled by different systems and departments within an institution. The employer must rely on the information provided to them by the employee for information regarding billable hours, which can result in inaccuracies that cost companies vast amounts of money. Another potential security concern arises with the employee's proximity to their workstation. Most systems have a timed logout after a period of inactivity, but such a time frame allows for potentially unauthorized access when the employee steps away without manually logging out of the system. The shortcomings of the current RFID cards or tags are numerous. In short, there is no way to have real time tracking information such as direction, time, location, and security safeguards.

SUMMARY

The present invention solves the aforementioned issues, as the invention provides security safeguards, real time and directional tracking, time logging, and other information required by commercial institutions. Employers may use the invention to further increase security in the workplace and limit financial waste. In the preferred embodiment of the invention, employers will be able to track an employee's movements throughout the day through the employment of an integrated electronic compass and accelerometer in conjunction with a received signal strength indicating (RSSI) system. This ensures that employees are working on the tasks required of them, and that they are not spending an inordinate amount of time in a certain area or on a particular task. Additionally, the use of the invention removes the human error associated with time cards or the like required for hourly pay of employees, saving the employer money.

The inclusion of a biometric sensor(s) gives an added accuracy and security feature to the invention at the benefit of the employer and employee. These safeguards can be further promoted with the inclusion of an electronic paper display. The electronic paper display can be used for photographic identification of the user and can only be manipulated through an authorized external power source. The invention is also self-sufficient due to the inclusion of a thin film micro energy cell (MEC) battery. This rechargeable battery, coupled with the energy harvesting features of the tag, removes the need for undue maintenance or battery costs/replacements.

According to one aspect of the invention, there is a wireless personal tracking device comprising an electronic paper display and biometric sensor. Additionally, the wireless personal tracking device comprises an external housing which contains a wireless transceiver, rechargeable battery, and a microprocessor. The wireless personal tracking device may also contain a Real Time Clock, accelerometer, and digital compass. The accelerometer works in conjunction with a radio frequency signal strength systems to enable the counting of directional steps taken by the user. In another aspect of the invention, the wireless personal tracking device has at least one switch and at least one light emitting diode.

The wireless personal tracking device has an electronic paper display which is only capable of being manipulated when connected to an external power source. The device works in conjunction with a host system and contains internal logging and recording software capable of tracking location, direction of movement, and the like.

In another aspect of the invention, a method of using the wireless personal tracking device is disclosed. This method comprises approaching a workstation or entryway, receiving a first signal from a host system, verifying user identity by biometric means, and sending a second signal to the host system. The first signal is prompted by a received signal strength indicator. The second signal may contain a secure code. An improper biometric identifier will prompt the user to input the information again.

BRIEF DESCRIPTION OF DRAWINGS

Preferred embodiments of the invention will now be described, by way of example, with reference to the accompanying drawings, in which.

DETAILED DESCRIPTION

Figure 1:
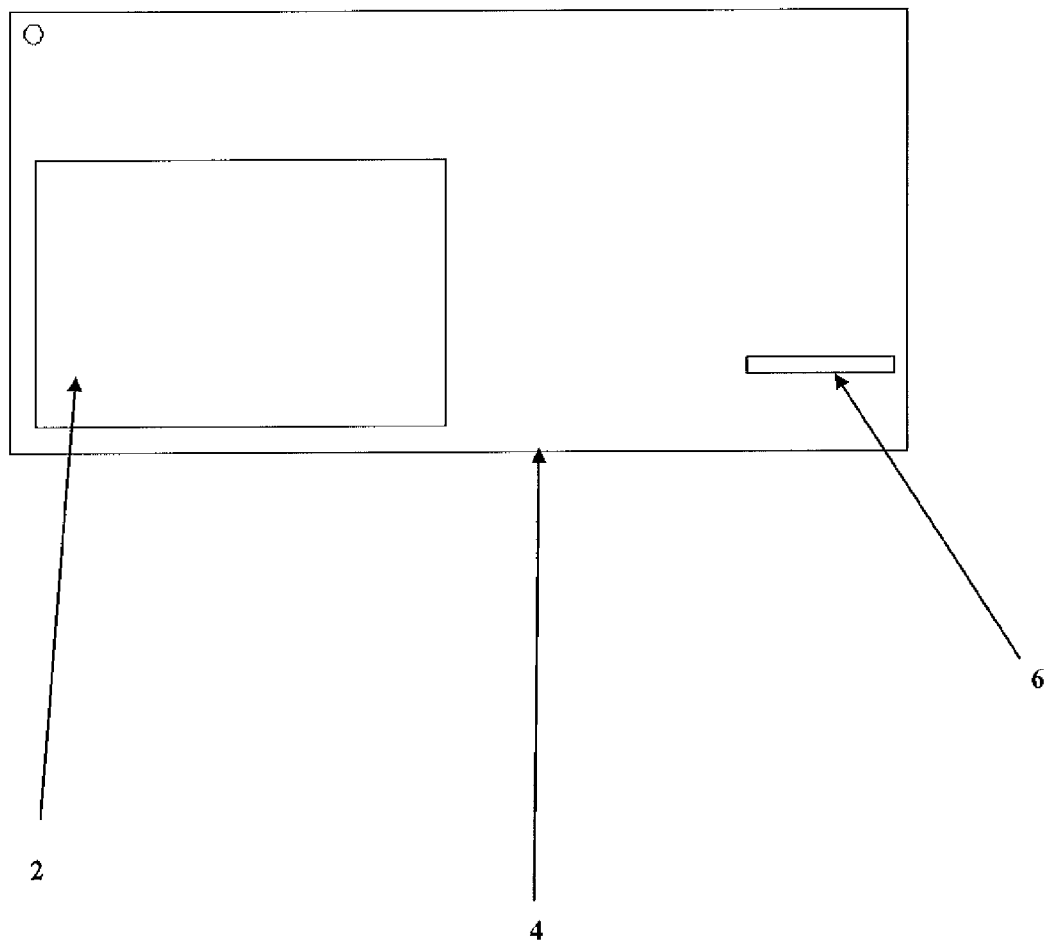
FIG. 1 is a perspective view of a preferred embodiment of the present invention.

Referring to the drawings, FIG. 1 demonstrates the preferred embodiment of the present invention. As shown in FIG. 1, the invention takes the form of an identification card.

However, other forms may include badges, key fobs, tag, or any other encapsulated electronic device. The external housing 4 contains the electrical components of the invention. These electrical components include, but are not limited to, an electronic compass, accelerometer, microprocessor, and radio transceiver. These features enable the directional tracking and movement of the device and associated user. These sensors provide the information to the microprocessor. The microprocessor, in turn, processes the data collected and manages the communication protocol (i.e. Bluetooth) between the invention and managing host system.

The electronic paper display 2 is embedded into the external housing 4. The electronic paper display 2 is intended to show the face of the user for identification purposes. However, it is a reconfigurable display, and thus can display various images. The electronic paper display 2 can only be manipulated by connecting the invention to an external power source capable of making such manipulations. Additionally, the invention has a biometric sensor 6, in the form of a fingerprint reader, embedded into the external housing 4.

The invention is also self-sufficient due to the inclusion of a thin film micro energy cell (MEC) battery. This battery enables the invention to be recharged when power is low, or constantly from drawing on energy harvesting features. The invention can be recharged during non-use by placing it near a near field inductive field or radio frequency field. The invention may be charged during use by the inclusion of a solar panel allowing the invention to harvest energy from the ambient lighting.

Figure 2:
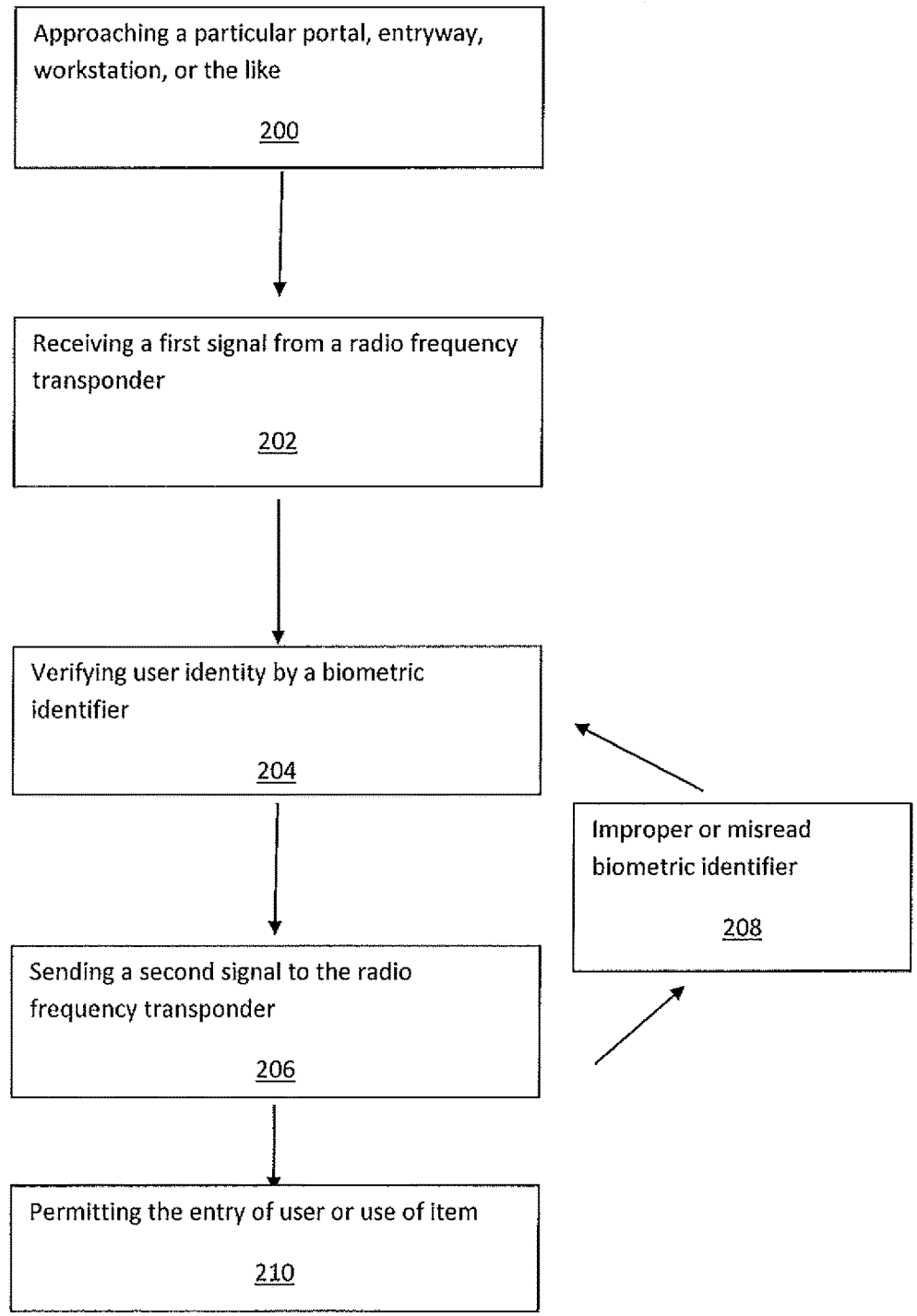
FIG. 2 is a flow chart detailing a method of use of a preferred embodiment of the present invention.

Referring to FIG. 2, a typical use of the tag is initiated by approaching a portal, workstation, or entryway 200. A received signal strength indicator (RSSI) will detect the tag and a radio frequency transponder, connected to a host system, sends a first signal to the tag 202 and consequently the user. Upon this signal or prompt, the user is required to input a biometric identifier in order to ensure access and properly verify the user's identity 204. Proper input of the biometric identifier sends a second signal to the radio frequency transponder 206. This signal, containing a secure code, which may include a one-time pass (OTP) key, prompts the host system to enable the user to enter or gain access to a specific area 210. The included electronic compass relays information to the host system in order to verify whether the user is entering or exiting the particular area. Additionally, small movements can be detected demonstrating that one is located in the office or area of desire and working, not simply leaving the device sitting on a table. Upon an improper or invalid biometric identifier, the user will be prompted to reenter the biometric identifier if entry or use is desired 208. Once access is gained, the accelerometer contained within the tag and the building's integrated RSSI system will track the user throughout the location.

The host system will comprise several software modules. This system can be installed and operate independently on existing servers at a location. The system can activate, deactivate, track, or query the cards or badges held by a user in real time. Supervisors can be alerted to the presence of a security breach of a tracked user. If need be, electronic or paper reports detailing movements and security events can be prepared.

What is claimed is:

1. An electronic identification device comprising:
   an external housing;
   an electronic paper display embedded in the external housing,
      wherein the electronic paper display is configured to contain an image of a user of the electronic identification badge;
   a fingerprint scanner coupled to a microprocessor;
   a memory coupled to the microprocessor, the memory including a one-time pass key configured to be sent to a host system when the fingerprint scanner receives an identity verification from a user;
   an electronic compass coupled to the microprocessor;
   an accelerometer coupled to the microprocessor;
   a wireless transceiver coupled to the microprocessor; and
   a thin film, rechargeable battery coupled to the microprocessor,
      wherein the thin film, rechargeable battery is configured to charge when placed in proximity to an inductive field.

2. The device of claim 1 further comprising a Real Time Clock.

3. The device of claim 1 wherein the accelerometer coupled with a proximity radio frequency signal strength enables the directional counting of steps taken by the user.

4. The device of claim 1 further comprising at least one switch and at least one light-emitting diode.

5. The device of claim 1 wherein the electronic paper display is a reconfigurable electronic ink display.

6. The device of claim 5 wherein the reconfigurable electronic ink display is configured to only be manipulated by coupling the electronic identification device to an external power source.

7. The device of claim 1 wherein the thin film, rechargeable battery is a thin film micro energy cell battery.

8. The device of claim 1 wherein the memory has an internal logging or recording system.

9. A method of using an electronic identification device comprising:
   approaching a portal, entryway, workstation with a device of claim 1;
   receiving a first signal from a radio frequency transponder connected to a host system;
   verifying user identity by a biometric identifier; and
   sending, via the device of claim 1, a second signal to the radio frequency transponder connected to the host system to permit user access to the portal, entryway, or workstation.

10. The method of claim 9 wherein the second signal contains a secure code.

11. The method of claim 9 wherein the first signal is prompted by a received signal strength indicator.

12. The method of claim 11 wherein the received signal strength indicator is employed for tracking and secure access purposes.

* * * * *